US012741456B2

(12) United States Patent
Parkinson et al.

(10) Patent No.: US 12,741,456 B2
(45) Date of Patent: Sep. 22, 2026

(54) MULTILAYER FILMS INCLUDING ETHYLENE-BASED COPOLYMERS

(71) Applicant: Dow Global Technologies LLC, Midland, MI (US)

(72) Inventors: Shaun Parkinson, Tarragona (ES); Salma El Marrasse Zarioui, Tarragona (ES); Arnaldo T. Lorenzo Loreto, Manvel, TX (US); Jesus Nieto Palomo, Tarragona (ES)

(73) Assignee: Dow Global Technologies LLC, Midland, MI (US)

( * ) Notice: Subject to any disclaimer, the term of this patent is extended or adjusted under 35 U.S.C. 154(b) by 142 days.

(21) Appl. No.: 18/714,131

(22) PCT Filed: Jan. 25, 2023

(86) PCT No.: PCT/US2023/061208
§ 371 (c)(1),
(2) Date: May 29, 2024

(87) PCT Pub. No.: WO2023/147324
PCT Pub. Date: Aug. 3, 2023

(65) Prior Publication Data

US 2025/0033335 A1 Jan. 30, 2025

(30) Foreign Application Priority Data

Jan. 28, 2022 (EP) .................................... 22382071

(51) Int. Cl.
*B32B 27/32* (2006.01)
*B32B 27/08* (2006.01)
*B32B 37/15* (2006.01)

(52) U.S. Cl.
CPC .............. *B32B 27/32* (2013.01); *B32B 27/08* (2013.01); *B32B 37/153* (2013.01); *B32B 2250/03* (2013.01); *B32B 2250/05* (2013.01); *B32B 2250/242* (2013.01); *B32B 2250/40* (2013.01); *B32B 2307/5825* (2013.01); *B32B 2307/72* (2013.01); *B32B 2307/7376* (2023.05); *B32B 2323/046* (2013.01)

(58) Field of Classification Search
None
See application file for complete search history.

(56) References Cited

U.S. PATENT DOCUMENTS 4,617,241 A 10/1986 Mueller
4,724,185 A * 2/1988 Shah ......................... B32B 7/12 156/244.11
2004/0175518 A1 9/2004 Wilburn et al.
2010/0119745 A1 5/2010 Nieto et al.
2014/0302295 A1 10/2014 Thies et al.
2017/0239921 A1* 8/2017 Menning ............... B32B 27/308

FOREIGN PATENT DOCUMENTS

EP 0369790 5/1990
WO 2007129078 11/2007
WO 2008079755 7/2008
WO 2018063693 4/2018
WO 2020219378 10/2020

* cited by examiner

*Primary Examiner* — Ramsey Zacharia

(57) ABSTRACT

Provided are multilayer films including ethylene-based copolymers. The multilayer films can be fully compatible with polyethylene recycling streams. The multilayer films comprise a first outer layer, a second outer layer, and a core, the core including a first core layer that includes an ethylene-based copolymer selected from the group consisting of ethylene/butyl acrylate copolymer, ethylene/ethyl acrylate copolymer, ethylene/methyl acrylate copolymer, and ethylene/vinyl acetate copolymer. The first core layer according to embodiments disclosed herein is less than 20% of the total thickness of the multilayer film. The multilayer films of the present invention can exhibit improved or desirable properties, such as high tear resistance, in comparison to existing multilayer film structures.

12 Claims, No Drawings

MULTILAYER FILMS INCLUDING ETHYLENE-BASED COPOLYMERS

TECHNICAL FIELD

Embodiments of the present disclosure generally relate to multilayer films, and more particularly relate to multilayer films including ethylene-based copolymers.

INTRODUCTION

Multilayer films that incorporate a variety of materials, including polypropylene, polyamide, and polyethylene terephthalate, are widely used in industrial and consumer products. Such films used in industrial and consumer products often require desirable properties such as sufficient tear resistance—for example, to avoid the film from breakage during the film wrapping process on a pallet. The combination of layers and materials can allow for good performance of the films, but such multilayer films can be difficult, if not impossible, to recycle together due to the different types of materials that are not recycle-compatible with each other. As demand for sustainable and recyclable materials continues to rise, there remains a need for multilayer films that can be recycled more easily and that exhibit desirable tear resistance and improved or maintained other properties.

SUMMARY

Embodiments of the present disclosure meet one or more of the foregoing needs by providing multilayer films that exhibit desirable tear resistance and include recycle-compatible ethylene-based polymers. The multilayer films can be fully recycle-compatible in polyethylene recycling streams, and the tear resistance performance of the inventive multilayer layer films can be better than other multilayer films. The multilayer films according to embodiments disclosed herein comprise at least a first outer layer, second outer layer, and a first core layer, wherein the first core layer comprises an ethylene-based copolymer and is less than 20% of the total thickness of the multilayer film. Without being bound by theory, among the other features, the structure of the film with a thin first core layer (less than 20% of the total thickness of the film) and a specific ethylene-based copolymer results in surprisingly desirable tear resistance and maintained or improved dart impact when compared to existing film structures.

Disclosed herein are multilayer films. In one aspect, the multilayer film comprises a first outer layer, a second outer layer, and a core, the core comprising one or more core layers; wherein the core is positioned between the first outer layer and the second outer layer; wherein the core comprises greater than 90 wt. % ethylene-based polymers, based on the total polymer weight of the core; and wherein a first core layer comprises an ethylene-based copolymer selected from the group consisting of ethylene/butyl acrylate copolymer, ethylene/ethyl acrylate copolymer, ethylene/methyl acrylate copolymer, and ethylene/vinyl acetate copolymer; wherein the first core layer is less than 20% of the total thickness of the multilayer film; and wherein the multilayer film has a cross direction tear resistance of at least 25 g/μm.

These and other embodiments are described in more detail in the Detailed Description.

DETAILED DESCRIPTION

Aspects of the disclosed multilayer films are described in more detail below. The multilayer films can have a wide variety of applications, including, for example, cast stretch films, blown films, oriented films, stretch hood films, or the like. The multilayer films are also suited for use in trash bag or trash liner, heavy duty shipping sack, mattress film, food storage, frozen food storage, fertilizer storage, silage and grain storage applications. This disclosure, however, should not be construed to limit the embodiments set forth below as this disclosure is an illustrative implementation of the embodiments described herein.

As used herein, the term "polymer" means a polymeric compound prepared by polymerizing monomers, whether of the same or a different type. The generic term polymer thus embraces the term homopolymer (employed to refer to polymers prepared from only one type of monomer), and the term copolymer. Trace amounts of impurities (for example, catalyst residues) may be incorporated into and/or within the polymer. A polymer may be a single polymer, a polymer blend, or a polymer mixture, including mixtures of polymers that are formed in situ during polymerization.

As used herein, the term "copolymer" means a polymer formed by the polymerization reaction of at least two structurally different monomers. The term "copolymer" is inclusive of terpolymers. For example, ethylene-based copolymers, such as ethylene/butyl acrylate copolymer, ethylene/ethyl acrylate copolymer, ethylene/methyl acrylate copolymer, and ethylene/vinyl acetate copolymer, include at least two structurally different monomers (e.g., ethylene/butyl acrylate copolymer includes copolymerized units of at least 50 wt. % ethylene monomer and butyl acrylate comonomer) and can optionally include additional monomers or functional materials or modifiers, such as acid, acrylate, or anhydride functional groups. Put another way, the copolymers described herein comprise at least two structurally different monomers, and although the copolymers may consist of only two structurally different monomers, they do not necessarily consist of only two structurally different monomers and may include additional monomers or functional materials or modifiers.

As used herein, the term "ethylene-based copolymer" shall mean copolymers comprising a majority amount (>50 wt. %) of units derived from ethylene monomer and units of at least one different comonomer. Ethylene-based copolymers are ethylene-based polymers as that term is defined below. Examples of ethylene-based copolymers include ethylene/butyl acrylate copolymer (units of ethylene monomer copolymerized with units of butyl acrylate comonomer), ethylene/ethyl acrylate copolymer (units of ethylene monomer copolymerized with units of ethyl acrylate comonomer), ethylene/methyl acrylate copolymer (units of ethylene monomer copolymerized with units of methyl acrylate comonomer), and ethylene/vinyl acetate copolymer (units of ethylene monomer copolymerized with units of vinyl acetate comonomer).

As used herein, the terms "polyethylene" or "ethylene-based polymer" shall mean polymers comprising a majority amount (>50 wt. %) of units which have been derived from ethylene monomer. This includes polyethylene homopolymers and ethylene-based copolymers. Unless expressly stated otherwise, the ethylene-based copolymers disclosed herein (e.g., ethylene/butyl acrylate copolymer, ethylene/ethyl acrylate copolymer, ethylene/methyl acrylate copolymer, and ethylene/vinyl acetate copolymer) are ethylene-based polymers.

Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE);

single-site catalyzed Linear Low Density Polyethylene, including both linear and substantially linear low density resins (m-LLDPE); ethylene-based plastomers (POP) and ethylene-based elastomers (POE); Medium Density Polyethylene (MDPE); and High Density Polyethylene (HDPE). These polyethylene materials are generally known in the art; however, the following descriptions may be helpful in understanding the differences between some of these different polyethylene resins.

The term "LDPE" may also be referred to as "high pressure ethylene polymer" or "highly branched polyethylene" and is defined to mean that the polymer is partly or entirely homo-polymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference). LDPE resins typically have a density in the range of 0.916 to 0.935 g/cm$^3$.

The term "LLDPE", includes both resin made using the traditional Ziegler-Natta catalyst systems and chromium-based catalyst systems as well as single-site catalysts, including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy), and includes linear, substantially linear or heterogeneous polyethylene copolymers or homopolymers. LLDPEs contain less long chain branching than LDPEs and include the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. No. 3,914,342 or U.S. Pat. No. 5,854,045). LLDPEs can be made via gas-phase, solution-phase or slurry polymerization or any combination thereof, using any type of reactor or reactor configuration known in the art.

The term "MDPE" refers to polyethylenes having densities from 0.926 to 0.935 g/cm$^3$. "MDPE" is typically made using chromium or Ziegler-Natta catalysts or using single-site catalysts including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy), and typically have a molecular weight distribution ("MWD") greater than 2.5.

The term "HDPE" refers to polyethylenes having densities greater than about 0.935 g/cm$^3$ and up to about 0.980 g/cm$^3$, which are generally prepared with Ziegler-Natta catalysts, chrome catalysts or single-site catalysts including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy).

The term "ULDPE" refers to polyethylenes having densities of 0.855 to 0.912 g/cm$^3$, which are generally prepared with Ziegler-Natta catalysts, chrome catalysts, or single-site catalysts including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy). ULDPEs include, but are not limited to, polyethylene (ethylene-based) plastomers and polyethylene (ethylene-based) elastomers.

As used herein, the term "core layer" refers to a non-skin or non-outer layer of a multilayer film. A core layer is an internal layer, i.e., a layer positioned between two outer layers, of a multilayer film. In one embodiment, a core layer is the non-outer layer of a three-layer film that comprises a first outer layer and a second outer layer. The totality of core layers in the multilayer film of this invention, i.e., one or a plurality, constitute the "core" of the film.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Disclosed herein are multilayer films. In some embodiments, the multilayer film can be an oriented film that is oriented in the machine and/or cross direction. In some embodiments, the multilayer film is a blown film. In other embodiments, the multilayer film is a cast film. In further embodiments, the multilayer film is a stretch hood film.

The multilayer films according to embodiments disclosed herein comprise a first out layer, a second outer layer, and a core, the core comprising one or more core layers. The core is positioned between the first outer layer and the second outer layer. The core comprises a first core layer that comprises an ethylene-based copolymer selected from the group consisting of ethylene/butyl acrylate copolymer, ethylene/ethyl acrylate copolymer, ethylene/methyl acrylate copolymer, and ethylene/vinyl acetate copolymer.

In some embodiments, the multilayer film comprises a first outer layer, a second outer layer, and a core, the core comprising one or more core layers; wherein the core is positioned between the first outer layer and the second outer layer; wherein the core comprises greater than 90 wt. % ethylene-based polymers, based on the total polymer weight of the core; and wherein a first core layer comprises an ethylene-based copolymer selected from the group consisting of ethylene/butyl acrylate copolymer, ethylene/ethyl acrylate copolymer, ethylene/methyl acrylate copolymer, and ethylene/vinyl acetate copolymer, wherein the first core layer is less than 20% of the total thickness of the multilayer film; wherein the multilayer film has a cross direction tear resistance of at least 25 g/μm.

In some embodiments, the ethylene-based copolymer comprises 80 to 100 wt. % of the first core layer, based on the total weight of the first core layer. In some embodiments, the ethylene-based copolymer has a melt index (I2) of less than 5 g/10 min. In some embodiments, the ethylene-based copolymer is ethylene/vinyl acetate copolymer comprising from 9 to 28 wt. % vinyl acetate comonomer, based on the total weight of the ethylene/vinyl acetate copolymer. In other embodiments, the ethylene-based copolymer is ethylene/butyl acrylate copolymer, ethylene/ethyl acrylate copolymer, or ethylene/methyl acrylate copolymer comprising from 15 to 30 wt. % acrylate comonomer, based on total weight of the ethylene-based copolymer.

In some embodiments, the first outer layer and the second outer layer comprise a polyethylene having a density less than 0.930 g/cc and a melt index (I2) less than 7 g/10 min.

In some embodiments, the core comprises 100 wt. % ethylene-based polymers. In some embodiments, the multilayer film comprises greater than 90 wt. % ethylene-based polymer, greater than 95 wt. % ethylene-based polymer, or greater than 99 wt. % ethylene-based polymer.

In some embodiments, the first core layer is from 5 to 15% of the total thickness of the multilayer film.

In some embodiments, the multilayer film comprises at least 5 layers including the first outer layer, the second outer layer, the first core layer, a second core layer, and a third core layer, wherein the first core layer is positioned between the second core layer and the third core layer, and the second core layer and the third core layer comprise, separately, a polyethylene having a density less than 0.930 g/cc and a melt index (I2) less than 7 g/10 min. In some embodiments, the multilayer film comprises from 5 to 11 layers.

A multilayer film of the present invention can comprise a combination of two or more embodiments as described herein.

First Outer Layer and Second Outer Layer of Multilayer Film

The first outer layer and the second outer layer of the multilayer film are not particularly limited. The first outer layer and the second outer layer can have the same polymer composition or different polymer composition. In embodiments, the first outer layer and the second outer layer have a thickness that is 80 to 90% of the total thickness of the multilayer film.

In some embodiments, the first outer layer and the second outer layer each comprise a polyethylene having a density less than 0.930 g/cc and a melt index (I2) of less than 7 g/10 min. All individual values and subranges less than or equal to 0.930 g/cm$^3$ are included and disclosed herein; for example, the density of the polyethylene can be from a lower limit of 0.870 g/cm$^3$ to an upper limit of 0.928, 0.925, 0.920 or 0.915 g/cm$^3$. All individual values and subranges between 0.870 and 0.930 g/cm$^3$ are included and disclosed herein. All individual values and subranges of a melt index (I2) of less than 7 g/10 min are disclosed and included herein. For example, the melt index (I2) of the polyethylene can be less than 6 g/10 min, less than 5 g/10 min, less than 4 g/10 min, less than 3 g/10 min, less than 2 g/10 min, or less than 1 g/10 min.

In some embodiments, the first outer layer and/or the second outer layer comprise an ethylene-based polymer such as an ULDPE, LLDPE, LDPE, MDPE, or HDPE. For example, in some embodiments, the first outer layer and/or the second outer layer comprise an ULDPE, LLDPE, an LDPE, or a blend thereof.

In embodiments where the first outer layer and/or the second outer layer comprise an LLDPE, the LLDPE can have a density less than or equal to 0.930 g/cm$^3$. All individual values and subranges less than or equal to 0.930 g/cm$^3$ are included and disclosed herein; for example, the density of the linear low density polyethylene can be from a lower limit of 0.870 g/cm$^3$ to an upper limit of 0.928, 0.925, 0.920 or 0.915 g/cm$^3$. All individual values and subranges between 0.870 and 0.930 g/cm$^3$ are included and disclosed herein.

Polyethylenes that are suited for use in the first outer layer and/or second outlier of some embodiments of the present invention include, without limitation, ultra low density polyethylene (ULDPE), low density polyethylene (LDPE), polyethylene plastomer/elastomer, linear low density polyethylene (LLDPE), medium density polyethylene (MDPE), high density polyethylene (HDPE), other ethylene-based polymers (e.g., enhanced polyethylene) having a density from less than 0.930 g/cm$^3$, olefin block copolymers, and combinations thereof. Various commercially available polyethylenes are contemplated for use as polyolefins in some embodiments of the present invention. Examples of commercially available polyethylene plastomers/elastomers that can be used in embodiments of the present invention include those available from The Dow Chemical Company under the names AFFINITY™ and ENGAGE™ such as AFFINITY™ PL 1880G. Examples of commercially available LDPE that can be used in embodiments of the present invention include those available from The Dow Chemical Company under the names DOW LDPE™ and AGILITY™. Examples of commercially available ULDPE that can be used in embodiments of the present invention include ATTANE™ ultra low density polyethylene commercially available from The Dow Chemical Company. Examples of commercially available LLDPE that can be used in embodiments of the present invention include DOWLEX™ linear low density polyethylene commercially available from The Dow Chemical Company. Examples of commercially available olefin block copolymers that can be used in embodiments of the present invention include those commercially available from The Dow Chemical Company under the name INFUSE™ Examples of other commercially available ethylene-based polymers that can be used in some embodiments include those available from The Dow Chemical Company under the names ELITE™, ELITE™ AT, and INNATE™

Core of Multilayer Film

The multilayer film comprises a core. The core comprises one or more core layers and comprises greater than 90 wt. % ethylene-based polymers, including the ethylene-based copolymer (described below). The core is positioned between the first outer layer and the second outer layer. The core comprises a first core layer. In some embodiments, the multilayer film is a three layer film comprising a first outer layer, a second outer layer, and a core, the core comprising a first core layer. In other embodiments, the core comprises a first core layer, a second core layer, and a third core layer, wherein the first core layer is positioned between the second core layer and the third core layer, the second core layer is positioned between the first outer layer and the first core layer, and the third core layer is positioned between the first core layer and the second outer layer. In embodiments where the core comprises a first core layer, a second core layer, and a third core layer, the multilayer film comprises at least five layers (e.g., a multilayer film having the structure of first outer layer/second core layer/first core layer/third core layer/second outer layer).

In some embodiments, the multilayer film comprises at least 5 layers including the first outer layer, the second outer layer, the first core layer, a second core layer, and a third core layer, wherein the first core layer is positioned between the second core layer and the third core layer, and the second core layer and the third core layer comprise, separately, a polyethylene having a density less than 0.930 g/cc and a melt index (I2) less than 7 g/10 min.

The core comprises a first core layer. In some embodiments, the first core layer comprises an ethylene-based copolymer selected from the group consisting of ethylene/butyl acrylate copolymer, ethylene/ethyl acrylate copolymer, ethylene/methyl acrylate copolymer, and ethylene/vinyl acetate copolymer. In some embodiments, the ethylene-based copolymer comprises from 80 to 100 wt. % of the first core layer, based on the total weight of the first core layer.

All individual values and subranges of from 80 to 100 wt. % are disclosed herein. In some embodiments, the ethylene-based copolymer comprises from 85 to 100 wt. %, from 90 to 100 wt. %, from 95 to 100 wt. %, or from 99 to 100 wt. % of the first core layer, based on the total weight of the first core layer.

In some embodiments, the ethylene-based copolymer of the first core layer has a density of from 0.900 g/cc to 0.950 g/cc. All individual values and subranges of from 0.900 g/cc to 0.950 g/cc are disclosed and included herein. For example, the ethylene-based copolymer of the first core layer can have a density of from 0.900 g/cc to 0.945 g/cc, from 0.905 g/cc to 0.945 g/cc, from 0.910 g/cc to 0.945 g/cc or from 0.920 g/cc to 0.945 g/cc.

In some embodiments, the ethylene-based copolymer of the first core layer has a melt index (I2) of less than 5 g/10 min. All individual values and subranges of less than 5 g/10 min are disclosed and included herein. For example, the ethylene-based copolymer can have a melt index (I2) of less than 5 g/10 min, less than 4 g/10 min, less than 3 g/10 min, less than 2 g/10 min, or less than 1 g/10 min.

In some embodiments, the ethylene-based copolymer is ethylene/vinyl acetate copolymer comprising from 9 to 28 wt. % vinyl acetate comonomer, based on the total weight of the ethylene/vinyl acetate copolymer. All individual values and subranges of from 9 to 28 wt. % are disclosed and included herein. For examples the ethylene/vinyl acetate copolymer can comprise from 10 to 25 wt. %, from 12 to 23 wt. %, or from 15 to 20 wt. % of vinyl acetate comonomer, based on total weight of the ethylene/vinyl acetate copolymer.

In some embodiments, the ethylene-based copolymer is ethylene/butyl acrylate copolymer, ethylene/ethyl acrylate copolymer, or ethylene/methyl acrylate copolymer comprising from 15 to 30 wt. % acrylate comonomer, based on total weight of the ethylene-based copolymer. All individual values and subranges of from 15 to 30 wt. % are disclosed and included herein. For example, the ethylene/butyl acrylate copolymer, ethylene/ethyl acrylate copolymer, or ethylene/methyl acrylate copolymer can contain from 15 to 28 wt. % or 15 to 26 wt. % acrylate comonomer.

Examples of commercially available ethylene-based copolymers selected from the group consisting of ethylene/butyl acrylate copolymer, ethylene/ethyl acrylate copolymer, ethylene/methyl acrylate copolymer, and ethylene/vinyl acetate copolymer that can be used in embodiments of the present invention include polymers under the name ELVALOY™ and ELVAX™ commercially available from The Dow Chemical Company.

In some embodiments, in addition to the ethylene-based copolymer, the first core layer can comprise an ethylene-based polymer such as an ULDPE, LLDPE, LDPE, MDPE, HDPE or combination thereof.

In some embodiments, in addition to the first core layer, the core of the multilayer film further comprises a second core layer and a third core layer, wherein the second core layer is positioned between the first outer layer and the first core layer, and the third core layer is positioned between the second outer layer and the first core layer.

In embodiments where the multilayer film comprises a first core layer, a second core layer, and a third core layer, each of the second core layer and third core layer comprise an ethylene-based polymer such as an ULDPE, LLDPE, LDPE, MDPE, HDPE or combination thereof. For example, in some embodiments, each of the second core layer and the third core layer, separately, comprises an LLDPE, an LDPE, or a blend thereof. In embodiments where each of the second core layer and the third core layer, separately, comprises an LLDPE, the LLDPE can have a density less than or equal to 0.930 g/cm$^3$. All individual values and subranges less than or equal to 0.930 g/cm$^3$ are included and disclosed herein; for example, the density of the linear low density polyethylene can be from a lower limit of 0.870 g/cm$^3$ to an upper limit of 0.928, 0.925, 0.920 or 0.915 g/cm$^3$. All individual values and subranges between 0.870 and 0.930 g/cm$^3$ are included and disclosed herein.

Additives

It should be understood that any of the foregoing layers can further comprise one or more additives as known to those of skill in the art such as, for example, antioxidants, ultraviolet light stabilizers, thermal stabilizers, slip agents, antiblock agents, antistatic agents, pigments or colorants, processing aids, crosslinking catalysts, flame retardants, fillers and foaming agents. For example, in some embodiments, the first outer layer and the second outer layer each comprise an antiblock agent.

Multilayer Films

Multilayer films disclosed herein can be produced using techniques known to those of skill in the art based on the teachings herein. For example, the multilayer film may be produced by coextrusion. The formation of coextruded multilayer films is known in the art and applicable to the present disclosure. Coextrusion systems for making multilayer films employ at least two extruders feeding a common die assembly. The number of extruders is dependent upon the number of different materials or polymers comprising the coextruded film. For example, a five-layer coextrusion may require up to five extruders although less may be used if two or more of the layers are made of the same materials or polymers.

The multilayer film of the present invention, in various embodiments, can have several desirable properties. Without being bound by any theory, the specific structure of the multilayer film, including the thin core layer comprising the specific ethylene-based copolymer, can result in the multilayer film having high tear resistance properties. In some embodiments, the multilayer film of the present invention has a machine direction tear resistance of at least 2000 g (or at least 2200 g, or at least 2400 g, or at least 2600 g, or at least 2800 g, or at least 3000 g), or in the range of from 2000 g to 4000 g, from 2400 g to 3900 g, from 2800 g to 3800 g, or from 3000 g to 3700 g. Machine direction tear resistance can also be expressed in grams per micrometer thickness of the multilayer film. For example, in some embodiments, the multilayer film of the present invention has a machine direction tear resistance of at least 20.0 g/μm (or at least 22.0 g/μm, or at least 24.0 g/μm, or at least 26.0 g/μm, or at least 28.0 g/μm, or at least 30.0 g/μm), or in the range of from 20.0 to 40.0 g/μm, from 24.0 to 39.0 g/μm, from 28.0 to 38.0 g/μm, or from 30.0 to 37.0 g/μm. Machine direction tear resistance can be measured in accordance with ASTM D1922-09.

Likewise, in some embodiments, the multilayer film has a cross direction tear resistance of at least 2500 g, (or at least 2600 g, or at least 2800 g, or at least 3000 g, or at least 3200 g, or at least 3300 g, or at least 3400 g), or in the range of from 2500 g to 4000 g, from 2800 g to 4000 g, from 3000 g to 4000 g, or from 3200 g to 4000 g. Cross direction tear resistance can also be expressed in grams per micrometer thickness of the multilayer film. For example, in some embodiments, the multilayer film has a cross direction tear resistance of at 25.0 g/μm (or at least 27.0 g/μm, or at least 29.0 g/μm, or at least 31.0 g/μm, or at least 32.0 g/μm, or at least 33.0 g/μm, or at least 34.0 g/μm), or in the range of from 25.0 to 40.0 g/μm, from 28.0 to 40.0 g/μm, from 30.0 to 40.0 g/μm, or from 32.0 to 40.0 g/μm. Cross direction tear resistance can be measured in accordance with ASTM D1922-09.

In some embodiments, the multilayer film has a dart impact of greater than 700 grams or greater than 725 grams, where dart impact is measured according to ASTM D 1709-1 6a.

In some embodiments, the multilayer film has a thickness between 50 and 150 microns, or alternatively between 75 and 125 microns, or alternatively between 90 and 110 microns.

In some embodiments, the multilayer film of the present invention comprises greater than 95 wt. % ethylene-based polymer, or greater than 99 wt. % ethylene-based polymer, or greater than 99.5 wt. % ethylene-based polymer, or greater than 99.9 wt. % ethylene-based polymer, based on the overall weight of the multilayer film. Because the multilayer films in some embodiments comprise greater than 90 wt. % ethylene-based polymer, they can be compatible with polyethylene recycling streams.

Articles

Embodiments of the present invention also provide articles including any of the inventive multilayer films described herein. Examples of such articles can include wraps, packages, flexible packages, pouches, and sachets. For example, in one embodiment, the multilayer film of the present invention is a heavy duty shipping sack. Articles of the present invention can be formed from the multilayer films disclosed herein using techniques known to those of skill in the art in view of the teachings herein.

Test Methods

Density

Density is measured in accordance with ASTM D792, and expressed in grams/cm$^3$ (g/cm$^3$ or g/cc).

Melt Index ($I_2$ and $I_{10}$)

Melt index ($I_2$) is measured in accordance with ASTM D-1238 at 190° C. at 2.16 kg. The values for melt indices are reported in g/10 min, which corresponds to grams eluted per 10 minutes.

Tear Resistance in Cross Direction (CD) and Machine Direction (MD)

Tear resistance of the example multilayer films is measured in both the machine direction (MD) and cross direction (CD) in accordance with ASTM D1922-09. The ASTM D1922-09 standard determines the average force to propagate tearing in the machine and cross direction through a specified length of plastic film after the tear has been started.

Dart Impact

Dart Impact is measured according to ISO 7765-1, Standard Test Methods for Determination of Impact Resistance of Plastic Film by the Free-Falling Dart Test Method, Method A. Method A employs a dart with a 38 mm+1 mm diameter hemispherical head dropped from a height of 0.66 m±0.01 m. This test method can be used for films whose impact resistances require masses of about 0.05 kg to about 2 kg to fracture them. Results expressed in grams (g).

EXAMPLES

The following examples illustrate the present invention but are not intended to limit the scope of the invention.

The raw materials shown in Table 1 are used to prepare the Inventive Films and Comparative Films discussed below. Each of the resins are commercially available from The Dow Chemical Company unless noted otherwise.

TABLE 1

| Commercial Name | Type | $I_2$ (g/10 min) | Density (g/cc) |
|---|---|---|---|
| ATTANE ™ SL 4100G | Ethylene-based polymer - ULDPE | 1.0 | 0.912 |
| DOWLEX ™ GM 8090 | Ethylene-based polymer - LLDPE | 1.0 | 0.916 |
| DOWLEX ™ 2045G | Ethylene-based polymer - LLDPE | 1.0 | 0.920 |
| INNATE ™ ST70 | Ethylene-based polymer | 0.85 | 0.926 |
| DOWLEX ™ ST2750 | Ethylene-based polymer | 1.5 | 0.950 |
| Polybatch AMF 705 HF* | Masterbatch | N/A | N/A |
| EL VALOY ™ AC 3427 | Ethylene/butyl acrylate copolymer (27 wt. % butyl acrylate) | 4.0 | 0.926 |
| ELVALOY ™ AC 3117 | Ethylene/butyl acrylate copolymer (17 wt. % butyl acrylate) | 1.5 | 0.924 |
| ELVALOY ™ AC 2116 | Ethylene/ethyl acrylate copolymer (16 wt. % ethyl acrylate) | 1.0 | 0.930 |
| ELVALOY ™ AC 1218 | Ethylene/methyl acrylate copolymer (18 wt. % methyl acrylate) | 2.0 | 0.940 |
| ELVALOY ™ AC 1125 | Ethylene/methyl acrylate copolymer (25 wt. % methyl acrylate) | 0.5 | 0.944 |
| ELVAX ™ 3165A | Ethylene/vinyl acetate copolymer (18 wt. % vinyl acetate) | 0.7 | 0.940 |
| ELVAX ™ 3130 | Ethylene/vinyl acetate copolymer (12 wt. % vinyl acetate) | 2.5 | 0.930 |

*Commercially available from LyondellBasell

Three-layer and nine-layer multilayer films are formed using the materials above. The three-layer multilayer films are produced on a Collin coextrusion blown film line, with a Blow-up Ratio (BUR) of 3.5 and a total thickness of 100 μm. The Collin coextrusion blown film line is produced by Collin Lab & Pilot Solutions GmbH. The Collin coextrusion blown film line is configured as shown in Table 2 below to prepare the multilayer films described in Tables 4.

The nine-layer multi-layer films of Table 5 are produced on a nine-layer Windmöller & Holscher VAREX II blown film line at an output rate of 200 kg/hr with a BUR of 2.1. The multi-layer films of Table 5 were produced at 100 μm. All percent (%) values provided in Tables 5 are weight percent based on the total weight of each layer. The Windmöller & Holscher VAREX II blown film line is manufactured by Windmöller & Holscher Corporation. It consists of 9 separate extruders (A-I) and is configured as shown in the Table 3 below.

TABLE 2

| Three-layer Blown Film Line Parameters | |
|---|---|
| Maximum hauloff speed | 30 m/min |
| Extruders size up to 9 Layers, 9 extruders: | 5(extr) × 20-25D (A/B/C/D/E)/ 4(extr) × 25-25D (F/G/H/I) |
| Die size | 100 mm |
| Die Gap | 1.8 mm |
| Max. Output | 8-50 kg/hour |
| Extruder size distribution: | 20 mm/25 mm/25 mm/20 mm/20 mm/ 20 mm/25 mm/25 mm/20 mm |
| Thickness working range | 10-250 micron |
| Max. Layflat width | 550 mm |

TABLE 3

| Nine-layer Blown Film Line Parameters | |
|---|---|
| Typical output | 180-200 kg/h |
| Thickness range | 20 to 250 microns |
| Haul-off speed range | 3 to 120 m/min |
| BUR range | 1.8 to 3.0 |
| Maximum layflat | 1600 mm |
| Die diameter | 250 mm |
| Die gap | 2.25 mm |
| Extruders A, B, H & I diameter | 60 mm |
| Extruders C, D, E, F & G diameter | 50 mm |
| Extruders A, B, H & I layer distribution | 10 to 20% |
| Extruders C, D, E, F & G layer distribution | 5 to 15% |
| Corona treatment range (if required) | 34 to 48 dynes |

TABLE 4

Three-Layer Multilayer Film Structures

| Film | Structure | Layer Ratio (A/B/A) |
|---|---|---|
| Inventive Film 1 | A: 100% ATTANE ™ SL 4100G<br>B: 100% ELVALOY ™ AC 3427 | 45%//10%//45% |
| Inventive Film 2 | A: 100% DOWLEX ™ GM 8090<br>B: 100% ELVALOY ™ AC 3427 | 45%//10%//45% |
| Inventive Film 3 | A: 100% DOWLEX ™ 2045G<br>B: 100% ELVALOY™ AC 3427 | 45%//10%//45% |
| Inventive Film 4 | A: 100% DOWLEX ™ 2045G<br>B: 100% EL VALOY ™ AC 3117 | 45%//10%//45% |
| Inventive Film 5 | A: 100% DOWLEX ™ 2045G<br>B: 100% EL VALOY ™ AC 2116 | 45%//10%//45% |
| Inventive Film 6 | A: 100% DOWLEX ™ 2045G<br>B: 100% EL VALOY™ AC 1218 | 45%//10%//45% |
| Inventive Film 7 | A: 100% DOWLEX ™ 2045G<br>B: 100% EL VALOY ™ AC 1125 | 45%//10%//45% |
| Inventive Film 8 | A: 100% DOWLEX ™ 2045G<br>B: 100% ELVAX ™ 3165A | 45%//10%//45% |
| Inventive Film 9 | A: 100% DOWLEX ™ 2045G<br>B: 100% ELVAX™ 3130 | 45%//10%//45% |
| Comparative Film A | A: 100% ATTANE ™ SL 4100G<br>B: 100% ATTANE ™ SL 4100G | 45%//10%//45% |
| Comparative Film B | A: 100% DOWLEX ™ GM 8090<br>B: 100% DOWLEX ™ GM 8090 | 45%//10%//45% |
| Comparative Film C | A: 100% DOWLEX ™ 2045G<br>B: 100% DOWLEX ™ 2045G | 45%//10%//45% |

TABLE 5

Nine-Layer Multilayer Film Structures

| Film | Structure | Layer Ratio (A/B/C/D/E/F/G/H/I) |
|---|---|---|
| Inventive Film 10 | A: 99% INNATE ™ ST70 + 1% Polybatch AMF 705 HF<br>B: 100% INNATE ™ ST70<br>C: 100% DOWLEX ™ ST2750<br>D: 100% INNATE ™ ST70<br>E: 100% INNATE ™ ST70<br>F: ELVALOY™ AC 3117<br>G: DOWLEX ™ ST2750<br>H: 100% INNATE ™ ST70<br>I: 99% INNATE ™ ST70 + 1% Polybatch AMF 705 HF | A: 27%<br>B: 10%<br>C: 5.5%<br>D: 5.5%<br>E: 4%<br>F: 5.5%<br>G: 5.5%<br>H: 10%<br>I: 27% |
| Inventive Film 11 | A: 99% INNATE ™ ST70 + 1% Polybatch AMF 705 HF<br>B: 100% INNATE ™ ST70<br>C: 100% DOWLEX ™ ST2750<br>D: 100% INNATE ™ ST70<br>E: 100% INNATE ™ ST70<br>F: ELVALOY ™ AC 3117<br>G: ELVALOY ™ AC 3117<br>H: 100% INNATE ™ ST70<br>I: 99% INNATE ™ ST70 + 1% Polybatch AMF 705 HF | A: 27%<br>B: 10%<br>C: 5.5%<br>D: 5.5%<br>E: 4%<br>F: 5.5%<br>G: 5.5%<br>H: 10%<br>I: 27% |
| Comparative Film D | A: 99% INNATE ™ ST70 + 1% Polybatch AMF 705 HF<br>B: 40% INNATE ™ ST70 + 60% DOWLEX ™ ST2750<br>C: 40% INNATE ™ ST70 + 60% DOWLEX ™ ST2750<br>D: 40% INNATE ™ ST70 + 60% DOWLEX ™ ST2750<br>E: 40% INNATE ™ ST70 + 60% DOWLEX ™ ST2750<br>F: 40% INNATE ™ ST70 + 60% DOWLEX ™ ST2750<br>G: 40% INNATE ™ ST70 + 60% DOWLEX ™ ST2750<br>H: 40% INNATE ™ ST70 + 60% DOWLEX ™ ST2750<br>I: 99% INNATE ™ ST70 + 1% Polybatch AMF 705 HF | A: 27%<br>B: 10%<br>C: 5.5%<br>D: 5.5%<br>E: 4%<br>F: 5.5%<br>G: 5.5%<br>H: 10%<br>I: 27% |

The tear resistance in the machine direction (MD) and cross direction (CD) as well as the Dart Impact are measured for each of the Comparative and Inventive Films. The results are reported in Table 6 below. As can be seen from the results, the Inventive Films exhibit surprisingly improved CD tear resistance and MID resistance over the Comparative Films. The dart impact of the Inventive Films is also desirable being improved or maintained in comparison to the Comparative Films. The Inventive Films include all ethylene-based polymers, which are desirable for polyethylene recycling streams. The Inventive Films include a thin core layer of an ethylene-based copolymer selected from the group consisting of ethylene/butyl acrylate copolymer, ethylene/ethyl acrylate copolymer, ethylene/methyl acrylate copolymer, and ethylene/vinyl acetate copolymer. This film structure with a thin core layer (e.g., 10% of the film for the three layer Inventive Films) demonstrates the surprising results of superior tear resistance properties that can be obtain through extrusion of thin layers of ethylene-based copolymers in films.

TABLE 6

MD and CD Tear Resistance of Examples

| Ex. | Thickness (μm) | CD Tear Resistance (g) | MD Tear Resistance (g) | Dart Impact (g) |
|---|---|---|---|---|
| Inventive Film 1 | 100 | 3556 | 3391 | 1242 |
| Inventive Film 2 | 100 | 3479 | 3015 | 704 |
| Inventive Film 3 | 100 | 3668 | 3553 | 900 |
| Inventive Film 4 | 100 | 3852 | 3273 | 818 |
| Inventive Film 5 | 100 | 3894 | 3423 | 825 |
| Inventive Film 6 | 100 | 3773 | 3575 | 867 |
| Inventive Film 7 | 100 | 3881 | 3562 | 867 |
| Inventive Film 8 | 100 | 3878 | 3369 | 773 |
| Inventive Film 9 | 100 | 3479 | 3169 | 738 |
| Inventive Film 10 | 100 | 3678 | 2182 | 725 |
| Inventive Film 11 | 100 | 3571 | 1950 | 807 |
| Comparative Film A | 100 | 2320 | 2070 | 1302 |
| Comparative Film B | 100 | 1420 | 1200 | 705 |
| Comparative Film C | 100 | 2340 | 1740 | 550 |
| Comparative Film D | 100 | 2495 | 843.4 | 524 |

Every document cited herein, if any, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A multilayer film comprising:

a first outer layer, a second outer layer, and a core, the core comprising one or more core layers; wherein the core is positioned between the first outer layer and the second outer layer; wherein the core comprises greater than 90 wt. % ethylene-based polymers, based on the total polymer weight of the core; and wherein a first core layer comprises an ethylene-based copolymer selected from the group consisting of ethylene/butyl acrylate copolymer, ethylene/ethyl acrylate copolymer, ethylene/methyl acrylate copolymer, and ethylene/vinyl acetate copolymer; wherein the first outer layer and second outer layer each comprise an ultra low density polyethylene (ULDPE), low density polyethylene (LDPE), polyethylene plastomer/elastomer, linear low density polyethylene (LLDPE), medium density polyethylene (MDPE), high density polyethylene (HDPE), olefin block copolymer, or combinations thereof;

wherein the first core layer is from 5 to less than 20% of the total thickness of the multilayer film;

wherein the multilayer film has a cross direction tear resistance of at least 25.0 g/μm.

2. The multilayer film of claim 1, wherein the ethylene-based copolymer comprises from 80 to 100 wt. % of the first core layer, based on the total weight of the first core layer.

3. The multilayer film of claim 1, wherein the ethylene-based copolymer has a melt index (I2) of less than 5 g/10 min.

4. The multilayer film of claim 1, wherein the ethylene-based copolymer is ethylene/vinyl acetate copolymer comprising from 9 to 28 wt. % vinyl acetate comonomer, based on the total weight of the ethylene/vinyl acetate copolymer.

5. The multilayer film of claim 1, wherein the ethylene-based copolymer is ethylene/butyl acrylate copolymer, ethylene/ethyl acrylate copolymer, or ethylene/methyl acrylate copolymer comprising from 15 to 30 wt. % acrylate comonomer, based on total weight of the ethylene-based copolymer.

6. The multilayer film of claim 1, wherein the first outer layer and the second outer layer each comprise a linear low density polyethylene having a density less than 0.930 g/cc and a melt index (I2) of less than 7 g/10 min.

7. The multilayer film of claim 1, wherein the core comprises 100 wt. % ethylene-based polymers.

8. The multilayer film of claim 1, wherein the first core layer is from 5 to 15% of the total thickness of the multilayer film.

9. The multilayer film of claim 1, wherein the multilayer film comprises at least 5 layers including the first outer layer, the second outer layer, the first core layer, a second core layer, and a third core layer, wherein the first core layer is positioned between the second core layer and the third core layer, and the second core layer and the third core layer comprise, separately, a polyethylene having a density less than 0.930 g/cc and a melt index (I2) less than 7 g/10 min.

10. The multilayer film of claim 1, wherein the multilayer film comprises greater than 95 wt. % ethylene-based polymers, based on total weight of the multilayer film.

11. The multilayer film of claim 1, wherein the first outer layer and the second outer layer have thickness that is 80 to 90% of the total thickness of the multilayer film.

12. The multilayer film of claim 1, wherein the first core layer comprises an ULDPE, LLDPE, LDPE, MDPE, HDPE, or combination thereof.

* * * * *